No. 727,154.

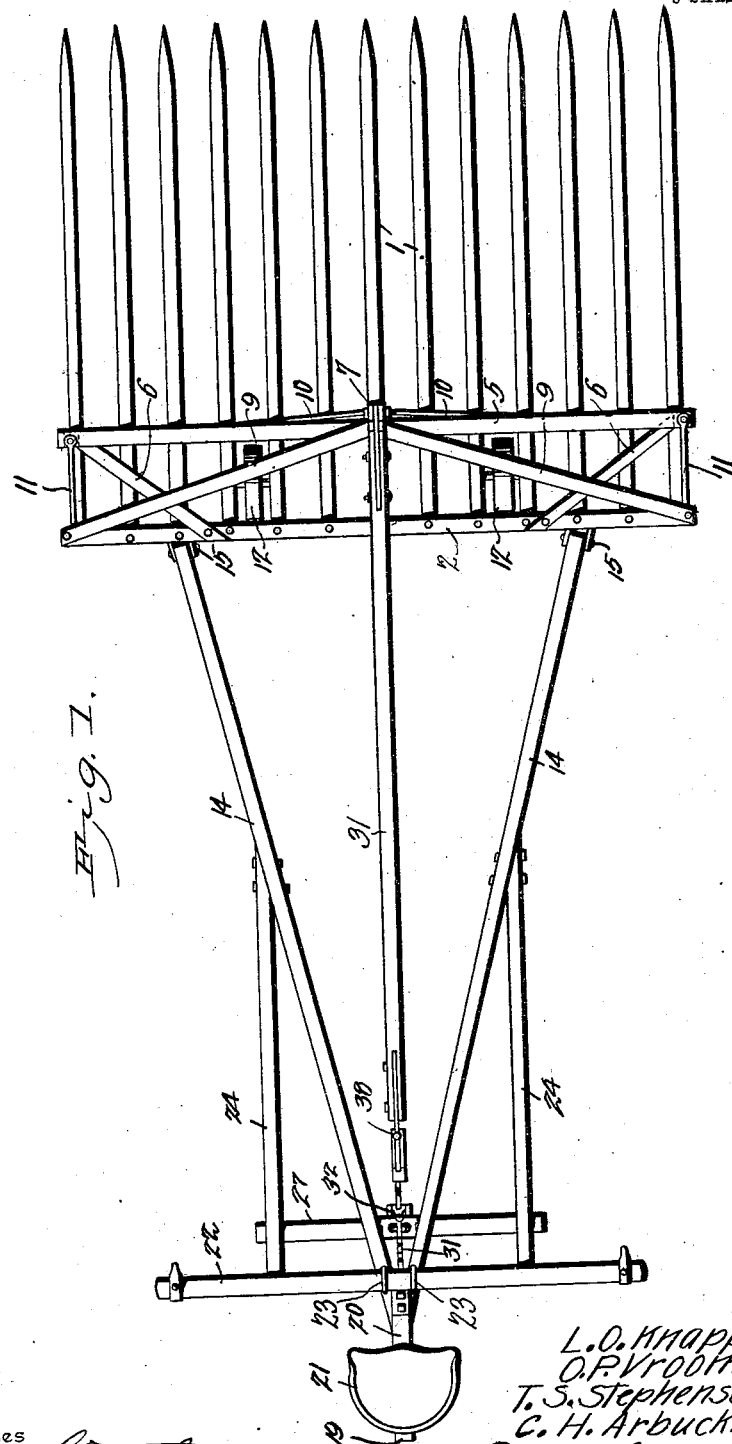

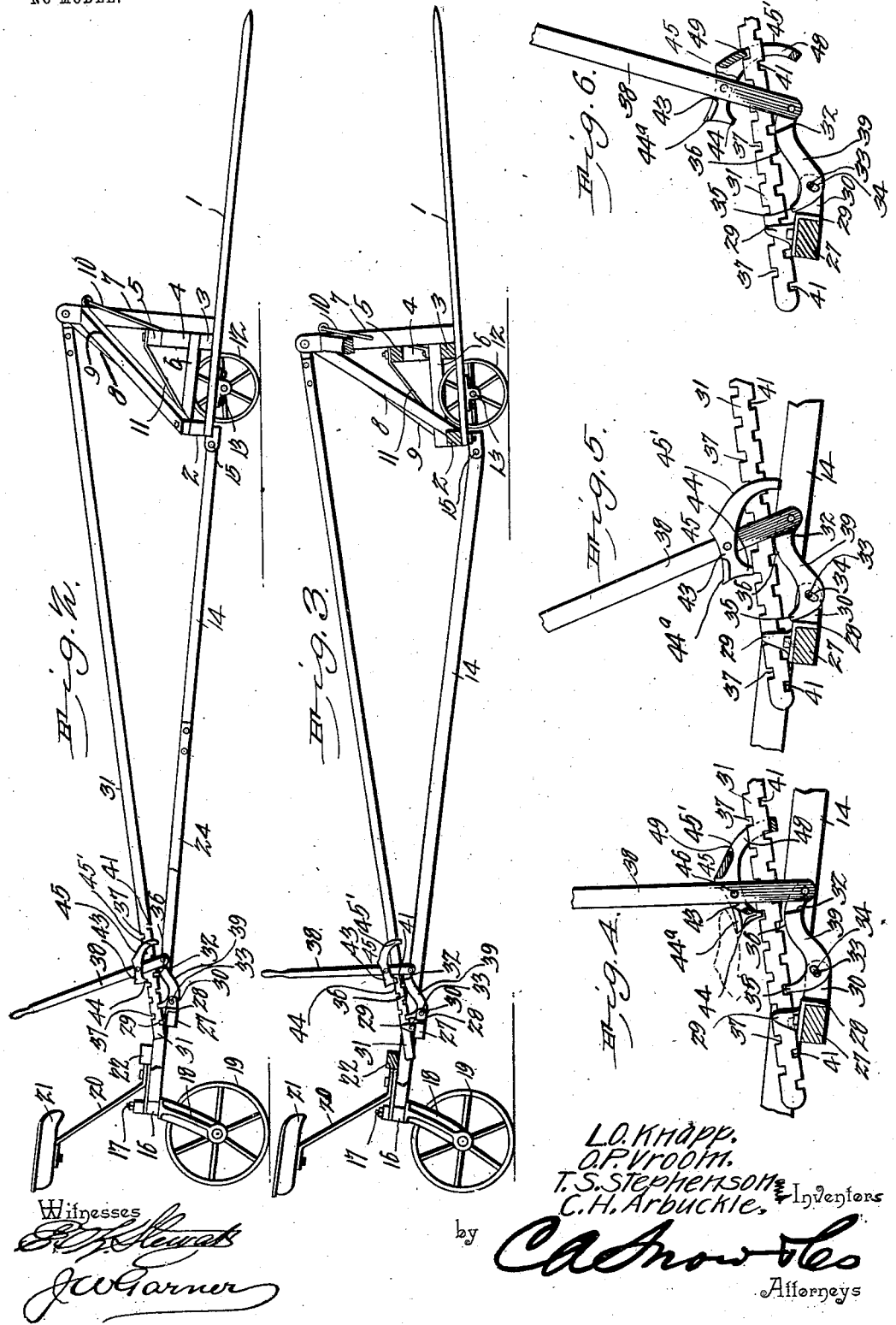

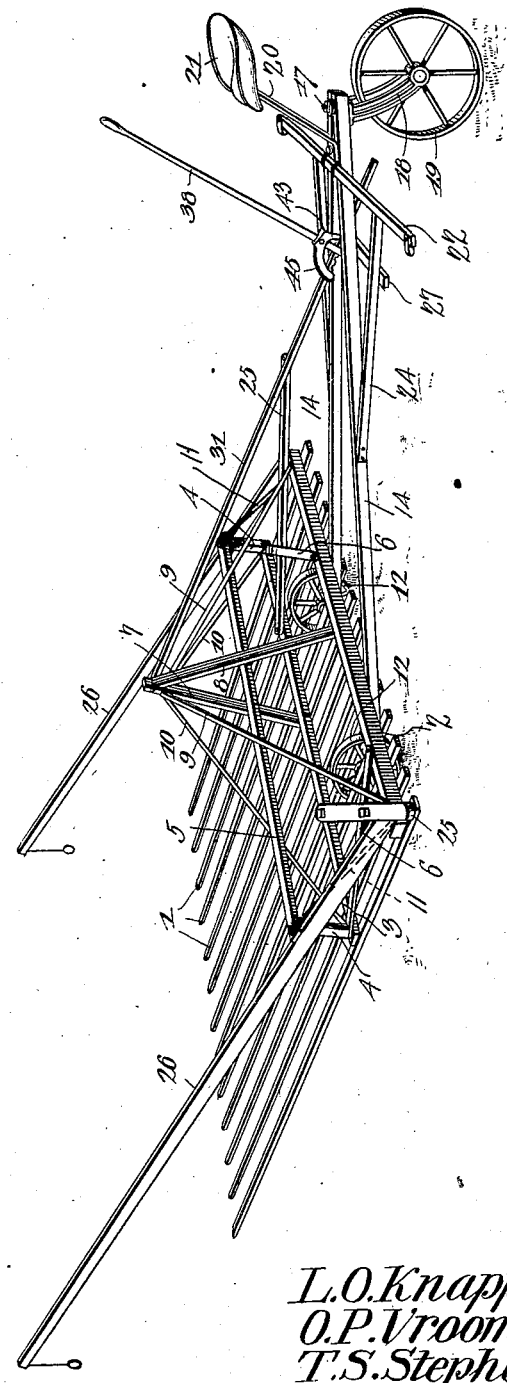

Patented May 5, 1903.

UNITED STATES PATENT OFFICE.

LEWIS O. KNAPP, OLER P. VROOM, THOMAS S. STEPHENSON, AND CHARLES H. ARBUCKLE, OF LINNEUS, MISSOURI.

HORSE HAY-RAKE.

SPECIFICATION forming part of Letters Patent No. 727,154, dated May 5, 1903.

Application filed June 16, 1902. Serial No. 111,967. (No model.)

*To all whom it may concern:*

Be it known that we, LEWIS O. KNAPP, OLER P. VROOM, THOMAS S. STEPHENSON, and CHARLES H. ARBUCKLE, citizens of the United States, residing at Linneus, in the county of Linn and State of Missouri, have invented a new and useful Horse Hay-Rake, of which the following is a specification.

This invention is an improved horse hay-rake of that class commonly known as "push-rakes," in which the rake-head is arranged in front of the horses and which are used in hay-fields for conveying hay from cocks or windrows to a stack and for other similar purposes; and it consists in the peculiar construction and combination of devices hereinafter fully set forth and claimed.

One object of this invention is to effect improvements in the construction of the rake-head whereby the same is greatly strengthened and is adapted to be used for raking and moving heavy hay without becoming strained and without sagging.

A further object of this invention is to provide improved means for tilting the rake-head to raise and lower the points of the rake-teeth.

In the accompanying drawings, Figure 1 is a top plan view of a rake constructed in accordance with this invention, the same being shown adapted for use as a "rear-hitch" rake. Fig. 2 is a side elevation of the same, showing the rake-head tilted to lower the points of the rake-teeth. Fig. 3 is a similar view of the same, partly in section, showing the rake-head tilted to raise the points of the rake-teeth. Fig. 4 is a detail sectional view showing the means for tilting the rake-head to raise and lower the points of the rake-teeth, the lever, gravity-dog, and link-dog being shown in the positions assumed thereby when raising the points of the rake-teeth. Fig. 5 is a similar view showing the lever turned rearwardly and the gravity-dog and link-dog disengaged from the operating-bar to release the latter, and hence permit the points of the rake-teeth to drop to the ground. Fig. 6 is a similar view showing the lever moved forwardly to engage the gravity-dog in such manner with the operating-bar as to cause the points of the rake-teeth to be pressed downwardly on the ground. Fig. 7 represents a perspective view taken from the rear of the machine.

The construction of the rake-head is as follows:

The rake-teeth 1 have their rear ends secured to the under side of a transversely-disposed bar 2, which forms the rear side of the rake-head. A cross-bar 3 is disposed at a suitable distance in advance of the rear cross-bar 2 and bears on the rake-teeth, the latter being also secured to said cross-bar 3. A pair of vertically-disposed posts 4 rise from the ends of and are secured to the cross-bar 3, and the upper ends of the said posts are connected together by a transversely-disposed plate-bar 5. The ends of the said plate-bar project outwardly beyond the said posts 4 for a suitable distance. A pair of obliquely-disposed brace-bars 6 are disposed at the rear corners of the rake-head, have their rear ends bolted or otherwise secured on the rear cross-bar 2 and their front ends bolted or otherwise secured on the ends of the cross-bar 3, between it and the posts 4. A truss-post 7 has its lower end secured to the front side of the cross-bar 3 at the center thereof. Said truss-post extends above the plate-bar 5 and is also secured on the front side of the center thereof. An inclined brace-bar 8 has its upper end secured to the rear side of the truss-post near the upper end of the latter and its lower end secured to the center of the rear cross-bar 2. A pair of obliquely-disposed oppositely-inclined brace-bars 9 have their outer ends secured to the ends of said rear cross-bar 2 and their inner upper ends secured to opposite sides of the truss-post 7 near the upper end of the latter. A pair of oppositely-inclined truss-rods 10 have their inner upper ends bolted or otherwise suitably secured to the truss-post 7 in the upper end thereof and their outer ends secured to the cross-bar 3 near the ends of the latter. The said truss-rods bear at points intermediate their ends against the front side of the plate-bar 5 and are bolted thereto. A pair of brace-rods 11 have their upper ends secured on the plate-bar 5 near the ends thereof and their rear ends secured to the ends of the rear cross-bar 2. It will be understood from the foregoing that the rake-head is braced and trussed in such manner as to render the same exceedingly strong, to prevent the same from getting out of shape, and to keep the rake-teeth in line with each other. The rake-head is provided with a pair of supporting-wheels which are disposed between the cross-bars 2 3 and at points intermediate the center and the sides of the rake-head. The bearings 13 for the said supporting-wheels are here shown as bolted to the under sides of those portions of certain of the rake-teeth which are between the cross-bars 2 3. It will be understood that by this disposition of the supporting-wheels between the center and the sides of the rake-head the stress of the load on the rake-head is distributed equally over the same. The trusses formed by the truss-post, brace-bars, and truss-rods also serve to distribute the stress equally over the rake-head and to prevent the same from sagging either at its center or its sides.

A pair of coupling-bars 14, which diverge forwardly, have their front ends hingedly connected to the rear side of the rake-head, as at 15. The rear ends of the said coupling-bars are secured to a bearing 16, in which are journaled the spindles 17 at the upper side of a fork 18, which carries the usual trail-wheel 19. The standard or bar 20, which carries the seat 21, has its lower end bolted or otherwise secured on the bearing 16. The seat is disposed directly above the trail-wheel. When the rake is adapted for use as a rear-hitch rake, a transversely-disposed draft-bar 22 has its central portion secured on the coupling-bars near the rear ends of the latter by clip-bolts 23 or other suitable devices, whereby the said draft-bar may be readily detached. Brace-bars 24 are also provided, which have their front ends bolted or otherwise detachably secured to the coupling-bars and their rear ends secured to the draft-bar. Said draft-bar and brace-bars 24 are shown in full lines in Fig. 1, and it will be understood that the singletrees are attached to the ends of the draft-bar. Hence the team may be hitched to said draft-bar behind the rake-head. When it is desired to use the rake, as shown in Fig. 7, as a "side-hitch" rake, the draft-bar and brace-bars 24 are removed and side-hitch poles 26, which are shown in full lines in Fig. 7, are employed. The said side-hitch poles are secured under the projecting ends of the plate-bar 5 and their rear ends are secured to the rear cross-bar 2. Draft-bars 25 will be used in connection with the side-hitch poles. The said draft-bars 25 are secured to said side-hitch poles near their rear ends, are disposed obliquely with reference to the rake-teeth, and their inner front ends are detachably secured on the cross-bar 3.

A transversely-disposed bar 27 of suitable length is secured to the under sides of the coupling-bars 14 near the rear ends thereof. On the central portion of the said bar 27 at a point between the said coupling-bars is secured a casting 28. The same is provided on its upper side with a pair of guide-lugs 29, suitably spaced apart, and is provided on its front side with a pair of forwardly-extending lugs 30. An operating-bar 31 has its front end pivotally connected to the upper end of truss-post 7. The rear portion of the said operating-bar bears on the casting 28 between the guide-lugs 29, and the said operating-bar is adapted to be moved longitudinally in opposite directions to tilt the rake-head in such manner as to raise or lower the points of the rake-teeth, as may be required. The operating-bar has notches 37 in its upper side and notches 41 in its lower side, as shown. A lever 38 has its lower end forked and disposed astride of the operating-bar. A link-dog 39 is pivoted at its front end in the fork of the lever 38 below the operating-bar. Said link-dog has a lateral offset near its front end, forming a shoulder 32, adapted to be engaged by the lever 38 when the latter is turned rearwardly. The rear portion of the link-dog is disposed between the lugs 30 of the casting 28 and is pivoted upon a bolt or pin 33, which connects said lugs and passes through an inclined slot 34 near the rear end of the link-dog. The latter has an upturned engaging point 35 at its rear end, adapted to enter the notches 41 in the lower side of the operating-bar, and is curved upwardly near its front end, as at 36, to bear under the operating-bar. A gravity-dog 45' is carried by the lever 38 and pivoted thereto at a point above the operating-bar by a bolt or pin 46. The said gravity-dog has a rearwardly-extending arm 43, having a foot-tread 44ª and a point 44 to engage a notch 37 in rear of the lever 38, and said gravity-dog also has a forwardly-extending downwardly-inclined counterbalancing-arm 45, which normally raises the rear arm of said dog and keeps the point 44 out of engagement with any of the notches 37. Said counterbalancing-arm has an opening 48, through which the operating-bar 31 extends and in which the same is adapted to slide, and said counterbalancing-arm is further provided with an engaging point 49 to enter the notches 37.

The operation is as follows: Initially, when the points of the rake-teeth are lowered the lever 38 will be turned forwardly, with the point 49 of the gravity-dog in engagement with one of the notches 37 on the operating-bar, so that the operator may, by means of the lever, hold the points of the teeth to the ground when the rake is being loaded by being drawn or pushed forwardly. When the lever is in this position, the link-dog is out of engagement with the notches 41 in the under side of the operating-bar. In order to raise the points of the rake-teeth after the rake-head has been loaded, the operator by placing one foot on the tread 44ª depresses the rear arm of the gravity-dog, so that its point 44 engages one of the notches 37, and its point 49 is released from the operating-bar. The lever 38 is then pulled rearwardly to a vertical position, causing the same and the gravity-dog to draw the operating-bar rearwardly, the forward pull of the lower end of the lever on the link-dog causing the latter, by reason of its inclined cam-slot 34 and the pin 33, to have its rear end raised so that the point 35 will engage one of the notches 41, and thus lock the operating-bar, so that the latter can support the rake-head and the load thereon in an elevated position. It will be understood that this operation of the lever 38 moves the operating-bar a distance equal to the space between two of its notches and that such operation must be repeated as many times as may be necessary to raise the point of the rake-teeth to the required height. To disengage the link-dog 39 from the operating-bar, permit the latter to move forwardly, and the points of the rake-teeth to drop, the operator moves the lever 38 rearwardly from a vertical to an inclined position, thereby causing the said lever by engaging the shoulder 32 of the link-dog to depress the rear end of the latter, so that its point 35 disengages the notch 41. This also causes the elevated portion 36 of the link-dog to bear under the operating-bar and prevent premature reëngagement of the point 35 with a notch 41 thereof.

Having thus described our invention, we claim—

1. A rake having a rake-head comprising a pair of cross-bars, disposed one in advance of the other, posts rising from the ends and center of the front cross-bar, a plate-bar connecting said posts, inclined brace-bars connecting the center post to the ends and center of the rear cross-bar, and truss-rods connecting the said center post to the ends of the front cross-bar, said rake-head having supporting-wheels connected therewith.

2. A rake having a rake-head comprising a pair of cross-bars disposed one in advance of the other, posts rising from the ends and center of the front cross-bar, a plate-bar connecting said posts, inclined brace-bars connecting the center post to the ends and center of the rear cross-bar, truss-rods connecting the said center post to the ends of the front cross-bar, obliquely-disposed brace-bars at the ends of the rake-head and connecting said cross-bars together, and braces for the side posts, said rake-head having supporting-wheels connected therewith.

3. In a rake, the combination of a rake-head, rake-teeth connected therewith, a longitudinally-movable bar to tilt said head, a lever having means for engaging said bar to positively move the same forward and press the points of the rake-teeth downward, and also provided with means to draw said bar backward and raise the head connected therewith, and means connected with said lever for locking said bar in drawn-back position to hold the rake-head elevated.

4. In a rake, the combination of a rake-head, rake-teeth connected therewith, a longitudinally-movable bar to tilt said head, a lever, a dog carried by said lever, said dog having means for engaging said bar to positively move the same forward and press the points of the rake-teeth downward, and also provided with means for engaging said bar and coacting with said lever to draw said bar backward and raise the head connected therewith, and means connected with said lever for locking said bar in drawn-back position to hold said rake-head elevated.

5. In a rake of the class described, the combination of a rake-head, a longitudinally-movable bar to tilt the same and having notches in its upper and lower sides, a dog having a fixed fulcrum and adapted to engage the lower notches, a lever pivoted to said dog, and a dog carried by said lever and adapted to engage the upper notches, substantially as described.

6. In a rake of the class described, the combination of a rake-head, a longitudinally-movable bar to tilt the same and having notches in its upper and lower sides, a dog having a fixed fulcrum and adapted to engage the lower notches, a lever pivoted to said dog, and a dog carried by said lever and adapted to engage the upper notches, said lever-carried dog having means to normally maintain the same in disengaged position, substantially as described.

7. In a rake of the class described, the combination of a rake-head, a longitudinally-movable bar to tilt the same and having notches in its upper and lower sides, a lever, a link-dog, having a fixed fulcrum and adapted to engage the lower notches of the bar, a lever pivoted to said link-dog, and a dog carried by the lever and having oppositely-extending points to respectively engage the upper notches of the bar, substantially as described.

8. In a rake of the class described, the combination of a rake-head, a longitudinally-movable bar to tilt the same and having notches in its upper and lower sides, a lever, a link-dog having a fixed fulcrum and adapted to engage the lower notches of the bar, a lever pivoted to said link-dog, and a dog carried by said lever, having oppositely-extending points to respectively engage the upper notches of the bar, and a gravity-arm to normally maintain one of said points in engaging position, substantially as described.

9. In a rake of the class described, the combination of a rake-head, a longitudinally-movable bar to tilt the same and having notches in its upper and lower sides, a guide for said bar, a link-dog having a cam-slot, a fixed fulcrum in said slot, and adapted to engage the lower notches of said bar, a lever pivoted to said link-dog, the latter and the lever having coacting stops, whereby the link-dog may be disengaged from the bar, and a dog, carried by the lever and having oppositely-extending points to respectively engage the upper notches of the said bar, substantially as described.

In testimony that we claim the foregoing as our own we have hereto affixed our signatures in the presence of two witnesses.

LEWIS O. KNAPP.
OLER P. VROOM.
THOMAS S. STEPHENSON.
CHARLES H. ARBUCKLE.

Witnesses:
W. H. KELLEY,
C. E. THOMPSON.